(12) United States Patent
Tong et al.

(10) Patent No.: US 9,182,954 B2
(45) Date of Patent: Nov. 10, 2015

(54) WEB BROWSER HAVING USER-CONFIGURABLE ADDRESS BAR BUTTON

(75) Inventors: Chee Chen Tong, Kirkland, WA (US); Amin Lakhani, Bellevue, WA (US); Yun Xu, Seattle, WA (US); Liang Chen, Bellevue, WA (US); Ricardo Meza, Woodinville, WA (US); Charles Morris, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 217 days.

(21) Appl. No.: 13/560,034

(22) Filed: Jul. 27, 2012

(65) Prior Publication Data

US 2014/0033080 A1    Jan. 30, 2014

(51) Int. Cl.
*G06F 9/44* (2006.01)
*G06F 17/30* (2006.01)

(52) U.S. Cl.
CPC ............ *G06F 8/38* (2013.01); *G06F 17/30864* (2013.01)

(58) Field of Classification Search
CPC ............ G06F 17/30861; G06F 3/1246; G06F 9/44505
USPC ................................ 715/760, 762, 764, 772
See application file for complete search history.

(56) References Cited

U.S. PATENT DOCUMENTS

| | | | |
|---|---|---|---|
| 6,073,136 A | 6/2000 | Bertram et al. | |
| 6,310,610 B1 | 10/2001 | Beaton et al. | |
| 6,624,831 B1 * | 9/2003 | Shahine et al. | 715/815 |
| 6,925,609 B1 * | 8/2005 | Lucke | 715/804 |
| 7,185,333 B1 * | 2/2007 | Shafron | 717/173 |
| 7,490,293 B1 * | 2/2009 | Humpleman et al. | 715/734 |
| 7,509,588 B2 * | 3/2009 | Van Os et al. | 715/835 |
| 7,707,505 B1 * | 4/2010 | Ohrt et al. | 715/738 |
| 7,899,829 B1 * | 3/2011 | Malla | 707/741 |
| 7,930,644 B2 * | 4/2011 | Silva et al. | 715/771 |
| 8,234,575 B2 * | 7/2012 | Hartin et al. | 715/744 |
| 8,402,375 B1 * | 3/2013 | Skare et al. | 715/738 |
| 8,661,349 B2 * | 2/2014 | Dobronsky et al. | 715/744 |
| 8,769,413 B2 * | 7/2014 | Odero et al. | 715/739 |
| 8,812,988 B2 * | 8/2014 | Kam et al. | 715/837 |
| 8,887,041 B2 * | 11/2014 | Jang | 715/253 |
| 2004/0165007 A1 | 8/2004 | Shafron | |
| 2004/0254855 A1 | 12/2004 | Shah | |
| 2005/0039144 A1 | 2/2005 | Wada et al. | |

(Continued)

OTHER PUBLICATIONS

International Search Report and Written Opinion mailed Sep. 23, 2013, issued in connection with corresponding International Application No. PCT/US2013/051757 (8 pages total).

(Continued)

*Primary Examiner* — David Phantana Angkool
(74) *Attorney, Agent, or Firm* — Aaron Chatterjee; Kate Drakos; Micky Minhas (57) ABSTRACT

A web browser has a user interface that includes a content rendering area within the web browser user interface and a control layout area adjacent the content rendering area. The control layout area includes a user-selectable icon that is always available to the user in the control layout area and which is user-configurable. For example, the user-configurable icon may be configured with one of two pre-defined functions. In one illustrative implementation the two pre-defined functions may be a tabs function and a favorites function.

11 Claims, 7 Drawing Sheets

(56) References Cited

U.S. PATENT DOCUMENTS

| | | |
|---|---|---|
| 2006/0218391 A1 | 9/2006 | Glazer et al. |
| 2006/0277478 A1 | 12/2006 | Seraji et al. |
| 2008/0172695 A1* | 7/2008 | Migos et al. .................... 725/45 |
| 2008/0184128 A1 | 7/2008 | Swenson et al. |
| 2010/0162165 A1 | 6/2010 | Addala et al. |
| 2011/0128244 A1 | 6/2011 | Cho et al. |
| 2011/0191516 A1* | 8/2011 | Xiong et al. .................. 710/305 |
| 2012/0066634 A1 | 3/2012 | Kim et al. |
| 2012/0102433 A1* | 4/2012 | Falkenburg ................... 715/835 |
| 2012/0131485 A1* | 5/2012 | Svendsen et al. ............. 715/769 |
| 2012/0151368 A1 | 6/2012 | Tam |

OTHER PUBLICATIONS

Rehman, A., "ICS Browser Plus: Enhanced Variant of Stock Android 4.0 Web Browser", Retrieved at <<http://www.addictivetips.com/mobile/ics-browser-plus-enhanced-variant-of-stock-android-4-0-web-browser/>>, Jan. 4, 2012, pp. 5.

Scott, Jehl., "Raising the Bar on Mobile", Retrieved at <<http://24ways.org/2011/raising-the-bar-on-mobile>>, Dec. 20, 2011, pp. 12.

* cited by examiner

WEB BROWSER HAVING USER-CONFIGURABLE ADDRESS BAR BUTTON

BACKGROUND

Online search driven by Web-based search engines has proven to be one of the most significant uses of computer networks such as the Internet. Computer users can employ a variety of search tools to search for content using different user interfaces and search methods. In some circumstances, mobile device users can also access Internet search tools to search for content. With recent improvements in wireless data communication functions and the data processing capability of mobile terminals, the use of the Internet through mobile terminals is increasing.

However, users of mobile devices such as cell phones may encounter difficulties using search technologies intended for larger devices such as desktop personal computers (PCs). Difficulties include the inability to display appropriate content, difficulty entering queries and taking other suitable actions such as navigation in an environment adapted to full screen displays, full-sized keyboards, and so on.

Studies have shown that people tend to want to focus on web site content and not necessarily the capabilities of their web browser when they are conducting browsing activities. Yet browser designs tend to focus on a user interface that emphasizes the browser's capabilities, thus making it more challenging for a user to focus on a web site's content. It can thus be difficult to find an appropriate balance between screen real estate devoted to content and quick accessibility to web browser control, particularly because the proper balance may differ from user to user.

SUMMARY

Some web browser users have been found to make more frequent use of certain icons while other users have been found to make more frequent use of other icons. For example, some users prefer to have the tabs icon always available on the screen, whereas other users prefer to have the favorites icon always available on the screen and have little use for the tabs icon. Neither set of users wishes to scroll through various menu options to access their preferred function. In one implementation, the concerns of users who make frequent use of the tabs icon as well as users who make frequent use of the favorites icon is addressed by providing an icon that is always present on the screen, but which is user configurable. Specifically, the user may be given the option of configuring this icon to function as a tabs icon or a favorites icon.

In one particular implementation, a web browser is provided which has a user interface that includes a content rendering area within the web browser user interface and a control layout area adjacent the content rendering area. The control layout area includes a user-selectable icon that is always available to the user in the control layout area and which is user-configurable. For example, the user-configurable icon may be configured with one of two pre-defined functions. In one illustrative implementation the two pre-defined functions may be a tabs function and a favorites function.

This summary is provided to introduce simplified concepts for managing an immerse environment that are further described below in the Detailed Description. This summary is not intended to identify essential features of the claimed subject matter, nor is it intended for use in determining the scope of the claimed subject matter.

DETAILED DESCRIPTION

Some web browsers attempt to maximize the amount of space dedicated to websites by hiding things like the status bar. This is particularly true for web browsers designed to operate on mobile devices such as smartphones, which have a limited amount of screen space in comparison to desktop devices such as personal computers (PCs). For instance, some web browsers attempt to reduce to a minimum the number of controls that appear on the screen, hiding many of the controls in various menus, which can slow user access to the controls. While some users find this satisfactory, other users prefer quick access to web browser controls. On the other hand, some web browsers surface many browser controls for all users, resulting in the user always seeing controls they might not use. Accordingly, it is desirable to maintain a careful balance between a minimalist approach in which relatively few controls are made available without going through menus and a more crowded approach in which relatively many controls are present on the screen. One particular example of how this balance may be achieved involves the tabs icon and the favorites icon.

Tabbed browsing provides users with greater flexibility by allowing them to simultaneously open multiple web pages within a single browser application window. Each open page is associated with a tab that can be selected by a user, and the contents of the selected tab will be displayed by the browser. If the user desires to retrieve a new page from a web site without losing the content contained in an already loaded page, a new tab can be opened using the tab icon and the new content can be loaded and associated with the new tab without disturbing the content of any previously opened tab. The user can then switch back and forth between pages simply by switching between the tabs.

A favorites icon allows users to save and easily access web sites specified by the user. Each entry in a favorites list generally includes a web site name and a network address corresponding to the web site name. The web site name is usually a hyperlink through which the user can directly access the web site.

Some users have been found to make frequent use of the tabs icon. For these users removing the tab icon from the screen and placing it in a menu is a significant inconvenience since it frustrates their ability to quickly switch tabs while waiting for a page to load. On the other hand, other users have been found to make frequent use of the favorites icon and express displeasure if it is removed from the screen.

One way to address the concerns of both of these types of users is to provide both a tabs icon and a favorites icon on the web browser screen. Indeed, the tabs icon and favorites icon on some desktop web browsers are always present on the screen. On a web browser intended for a desktop computer, this is a viable and often used option since there is a relatively large amount of screen space available. However, this approach is less desirable for use by a mobile web browser because the relative amount of available screen space they take up is more significant. Accordingly, neither the provision nor the elimination of both the tabs and favorites icons is a particularly satisfying approach for a large number of users As discussed in more detail below, another way to address the concerns of users who make frequent use of the tabs icon as well as users who make frequent use of the favorites icon is to provide an icon that is always present on the screen but which is user configurable. Specifically, the user may be given the option of configuring this icon to function as a tabs icon or a favorites icon.

In various embodiments, a web browser user interface includes a content rendering area and a control layout area adjacent the content rendering area. The control layout area includes a user-selectable icon that is always (i.e., whenever the control layout area of the web browser interface is available to the user) available to the user in the control layout area. The user-selectable icon has a function that is user-configurable.

OPERATING ENVIRONMENT

Figure 1:
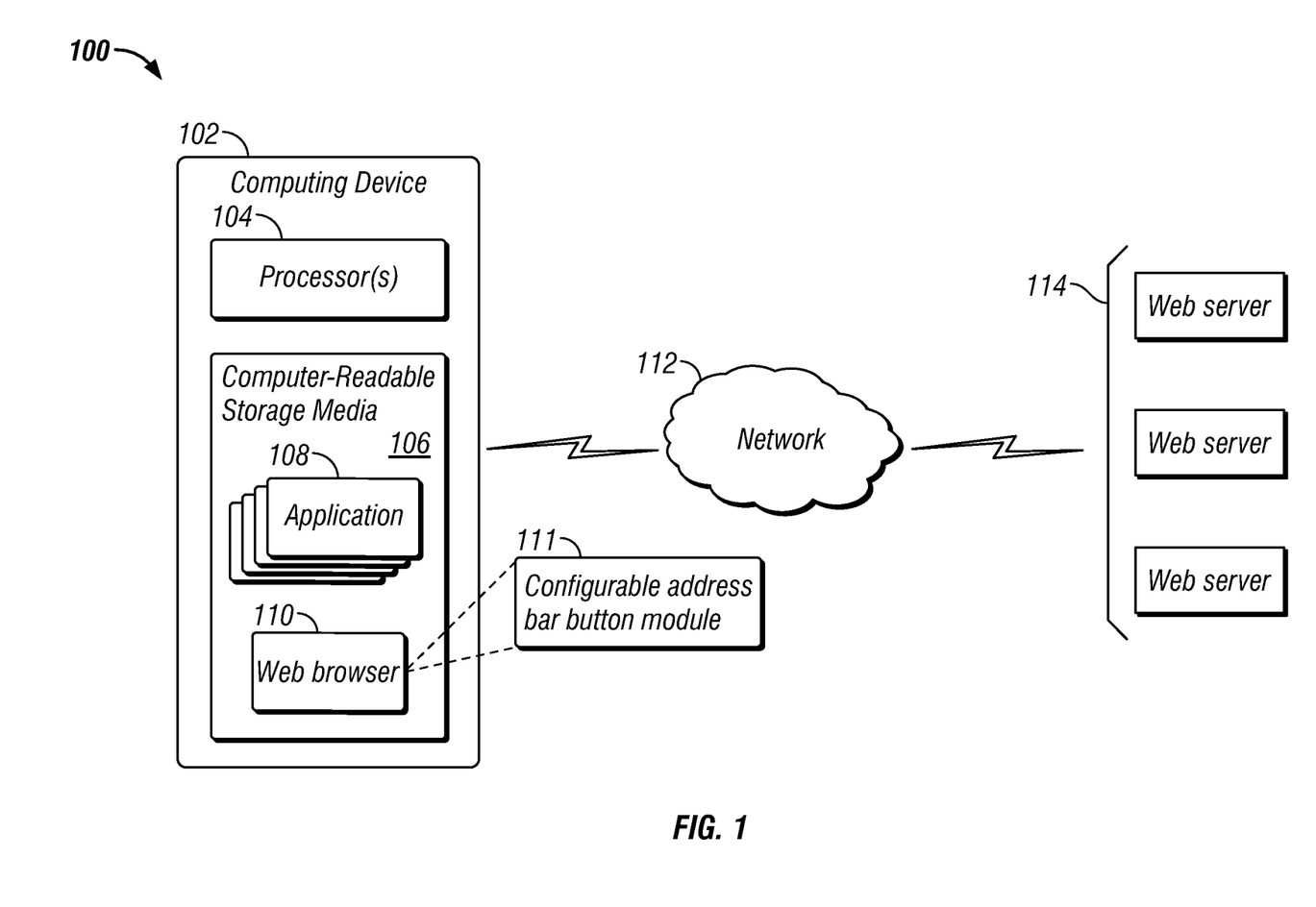
FIG. 1 illustrates an operating environment in which the processes described herein may be implemented.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 10.

In addition, computing device 102 includes a software application in the form of a web browser 110 that includes or otherwise makes use of a configurable address bar button module 111 to provide a web browser user interface that operates as described above and below. The configurable address bar button module 111 is designed to assist users in focusing on a website's content, while removing some of the distractions that can be provided by controls. For example, the web browser user interface, via the configurable address bar button module 111, can allow a user to select the functionality to be performed by the icon that is always accessible to the user whenever the control area of the web browser interface is made available to the user. In this way the user can ensure that only screen space devoted to a web browser control provides functionality that will actually be of use to the user.

In addition, environment 100 includes a network 112, such as the Internet, and one or more web servers 114 from and to which content can be received and sent, as described above and below. Such content can include web pages that are received from the web servers.

Computing device 102 can be embodied as any suitable computing device such as, by way of example and not limitation, a desktop computer, a portable computer, a handheld computer such as a personal digital assistant (PDA), cell phone, tablet and the like. In some implementations in which the computing device 102 is a portable or handheld device, web browser 110 may be a mobile web browser specifically configured for devices with relatively small displays, while the configurable address bar button module 111 described herein is particularly suitable for use with a mobile web browser, it may be used with desktop web browsers as well, which are intended for use with larger screens than are available on mobile devices.

Having described an example operating environment, some example configurable address bar button will now be presented which utilize the configurable address bar button module 111.

Example Configurable Address Bar Button

Figure 2:
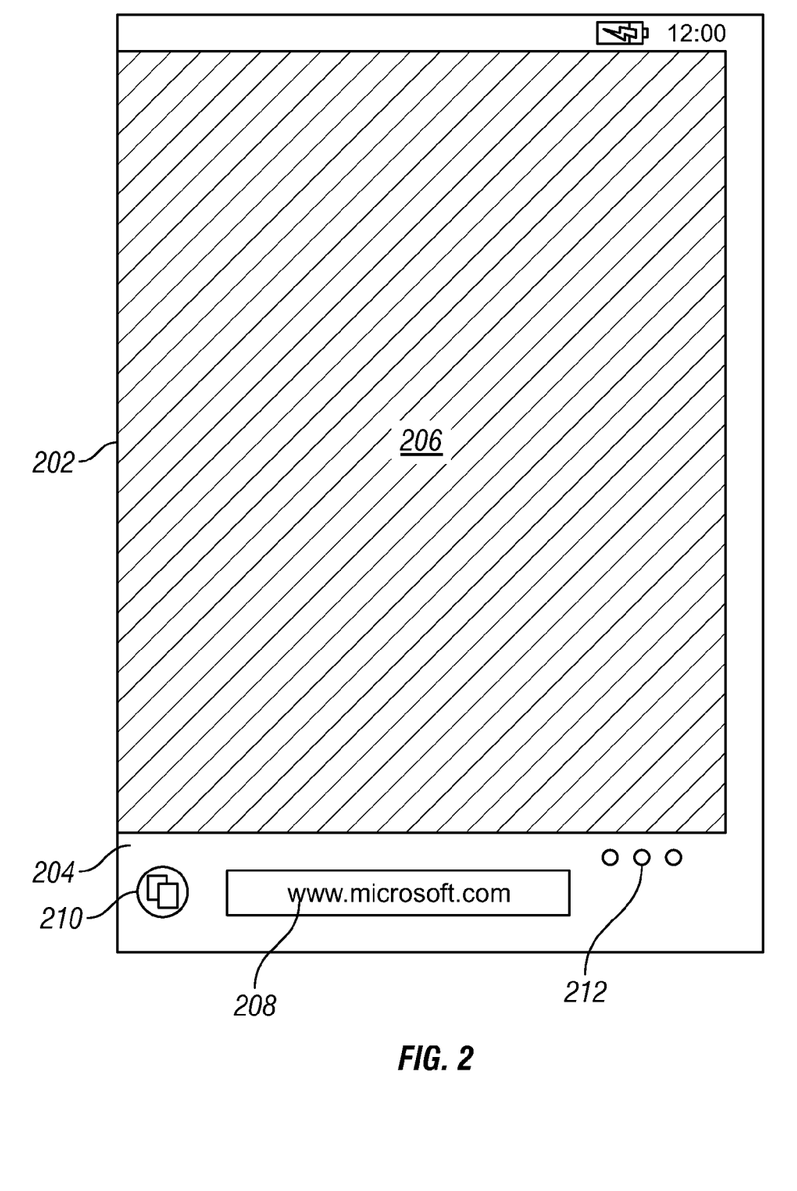
FIG. 2 illustrates an example of a mobile web browser user interface with a user-configurable icon that provides a tabs function.

FIG. 2 illustrates an example of a mobile web browser user interface 202 in accordance with one or more embodiments. In this particular example, web browser user interface 202 includes a control layout area 204 adjacent and below a content rendering area 206.

The control layout area 204 is designed to assist users in focusing on a website's content, such as that rendered within content rendering area 206, while removing some of the distractions that can be provided by controls. In particular, the web browser user interface 202 can include a navigation icon 208, which in this example is an input field which may serve, for instance, as an address bar. The control layout area 204 also includes a menu icon 212 for access to various items.

Figure 3:
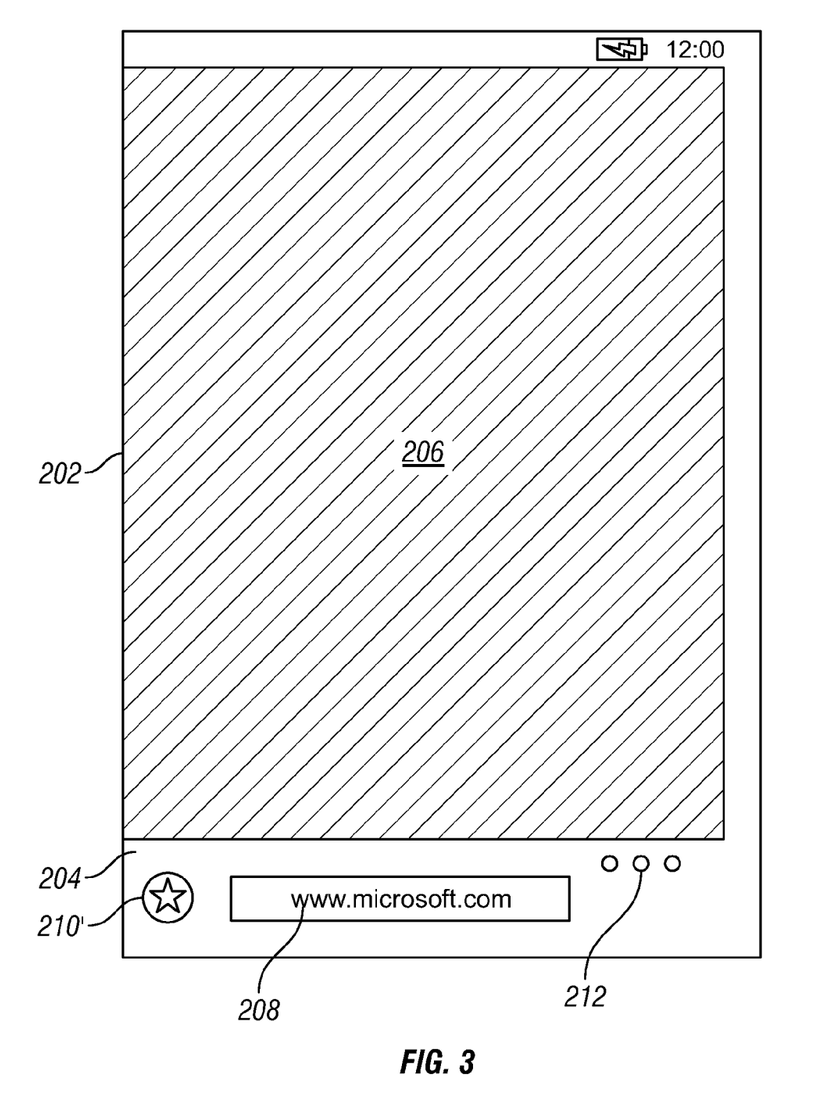
FIG. 3 illustrates an example of a mobile web browser user interface with a user-configurable icon that provides a favorites function.

The control layout area 204 also includes a user-selectable icon 210 that is always available to the user in the control layout area. That is, user-selectable icon 210 cannot be removed by the user though a settings menu or the like. User selectable icon 210 is provided under the influence of the configurable address bar button module 111 (FIG. 1). The user-selectable icon 210 does have a function that is user-configurable. For instance, in one particular embodiment, the user may select between two available functions. By way of example, one such function may be a tab function. Another one of the functions that the user may select is a favorites function. That is, the user is given the option of defining the user-selectable icon so that it functions as either a tabs button or a favorites button. Of course, in other implementations, the number of different functions from among which the user may select may be greater than two. Moreover, the functions themselves are not limited to a tab function and a favorites function. More generally, the user may be provided with the option of selecting from among a number of different functions. FIG. 2 shows the icon 210 when the user has defined it to function as a tabs button. FIG. 3 shows the icon 210' when the user has defined it to function as favorites button. In FIGS. 2 and 3, as well as the figures that follow, like elements are denoted by like reference numerals.

In some implementations the user-selectable icon may have a default function that is established if the user does not make a different selection. For instance, the default function may be a refresh/stop function.

Figure 4:
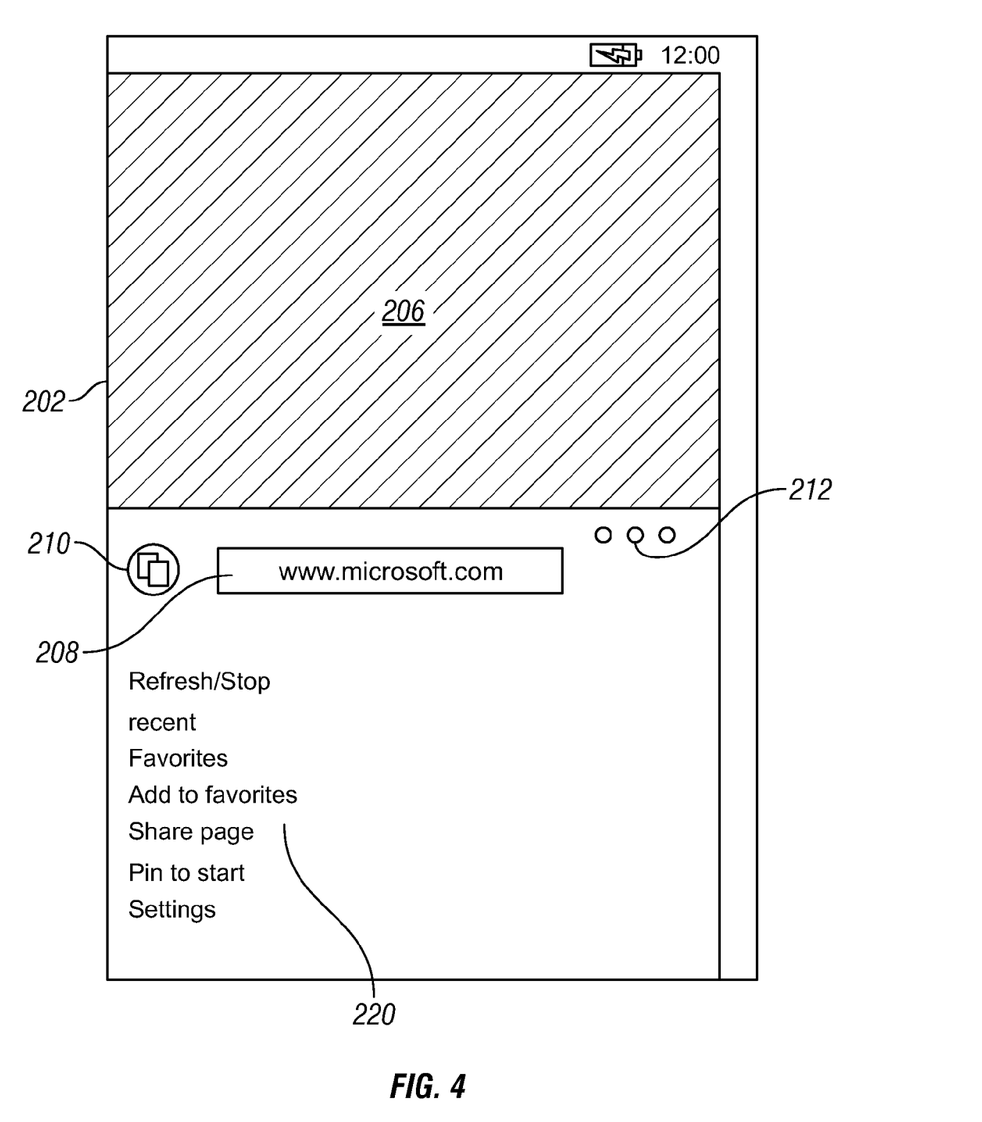
FIG. 4 shows a menu icon which presents a list of functions from which the user can choose, including functions for the user-configurable icon that is always available to the user.
Figure 5:
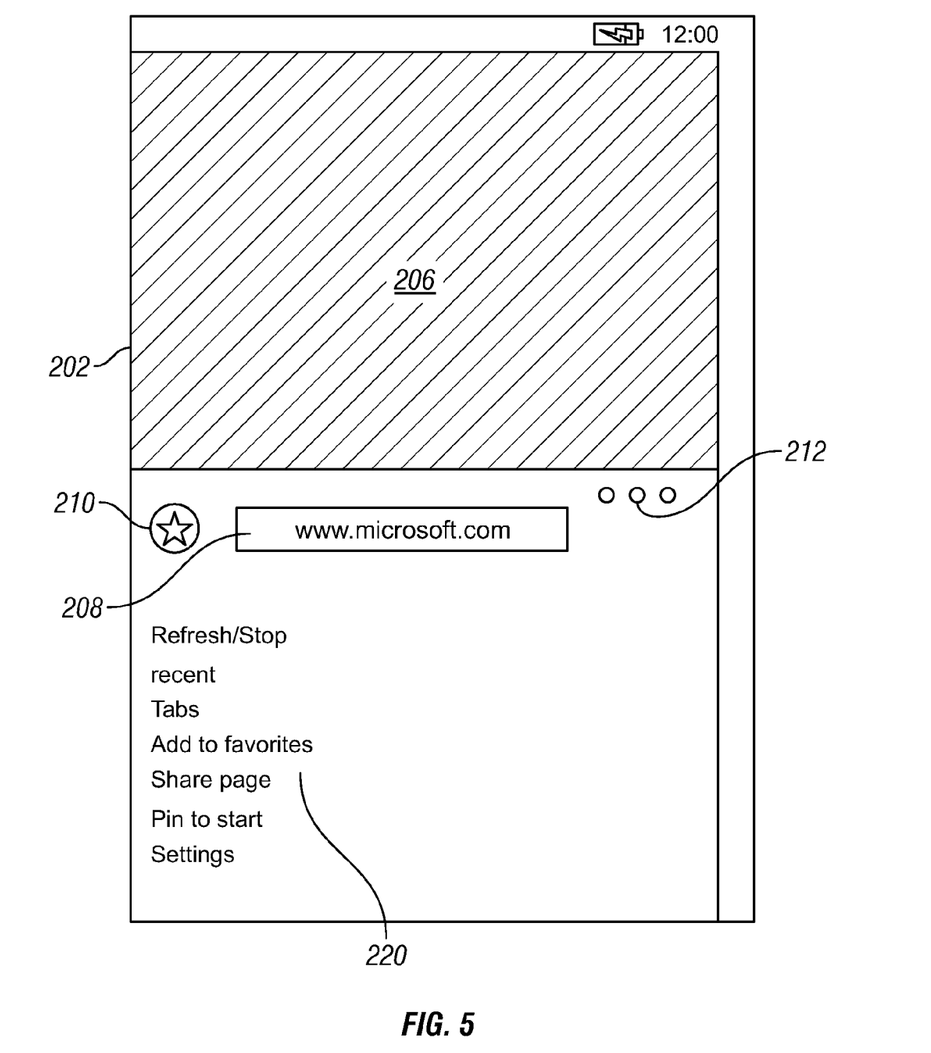
FIG. 5 shows another menu icon which presents a list of functions from which the user can choose.

In some implementations selection of menu icon 212 presents a list of functions from which the user can choose. An example of such a list 220 is shown in the web browser user interface of FIG. 4. In one embodiment, the list 220 includes the function for the user selectable icon 210 which has not been selected by the user to appear on the screen. For instance, in FIG. 4 the user-selectable icon 210 represents the tabs function. Accordingly, the list 220 includes the favorites function. On the other hand, as shown in the web browser user interface of FIG. 5, the user-selectable icon 210 represents the favorites tabs and thus the list 220 has automatically been reconfigured to include the tabs function.

Example Method

Figure 6:
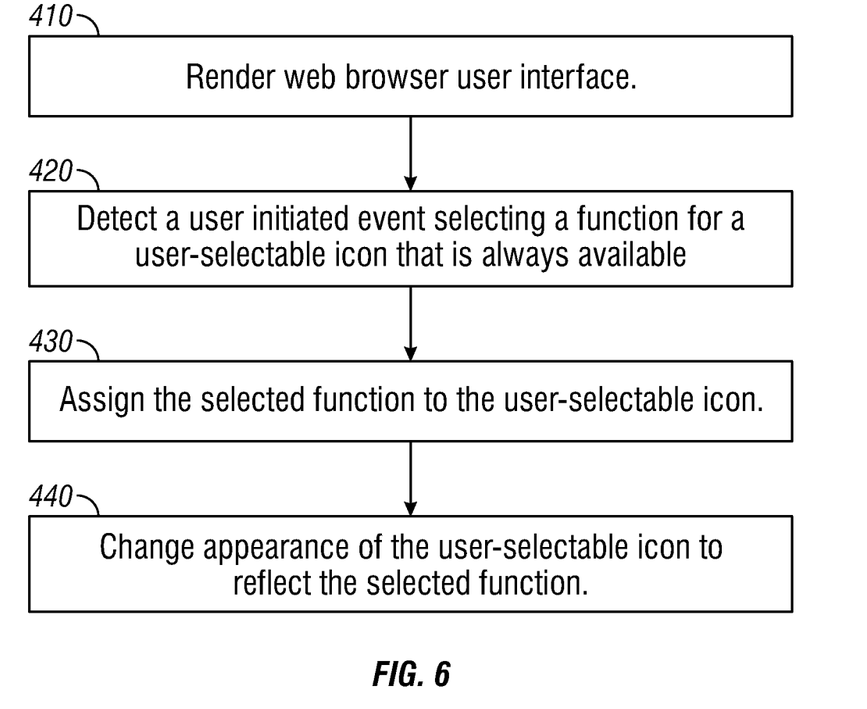
FIG. 6 is a flow diagram that describes a method in accordance with one or more embodiments of the subject matter described herein.

FIG. 6 is a flow diagram that describes a method in accordance with one or more embodiments. The method can be implemented in connection with any suitable hardware, software, firmware, or combination thereof. In at least some embodiments, the method can be implemented in software in the form of a web browser and/or a configurable address bar button module 111, such as the one described above.

Step 410 renders a web browser user interface. Step 420 detects a user initiated event selecting a function for a user-selectable icon that is always available to the user in a control layout area of the web browser user interface. Responsive to the user initiated event, step 430 assigns the selected function to the user-selectable icon. Step 440 changes the appearance of the user-selectable icon to reflect the selected function.

Figure 7:
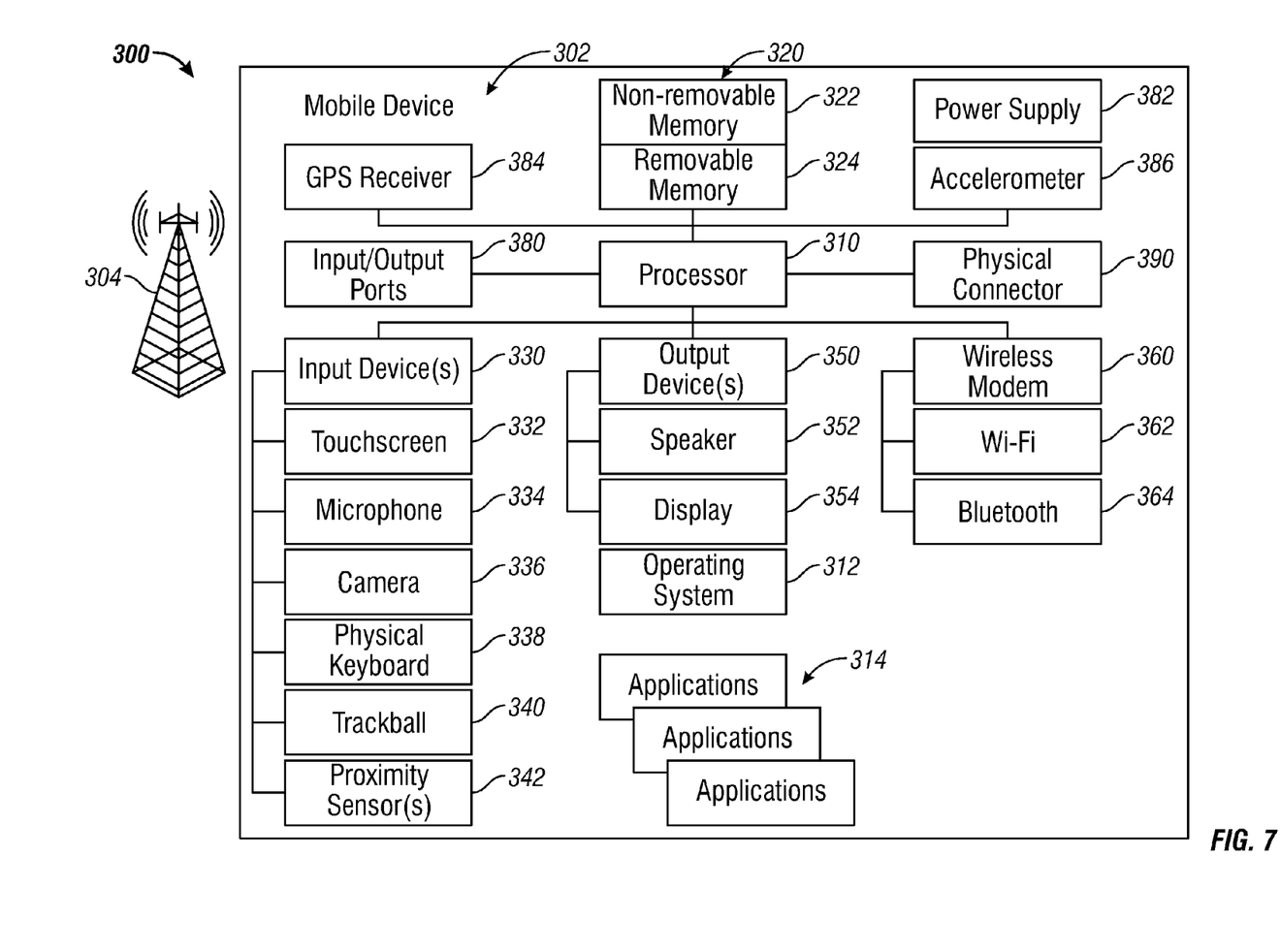
FIG. 7 is a system diagram depicting an exemplary mobile device on which the processes described herein may operate.

FIG. 7 is a system diagram depicting an exemplary mobile device 300 including a variety of optional hardware and software components, shown generally at 302. Any components 302 in the mobile device can communicate with any other component, although not all connections are shown, for ease of illustration. The mobile device can be any of a variety of computing devices (e.g., cell phone, smartphone, tablet or other handheld computer, Personal Digital Assistant (PDA), etc.) and can allow wireless two-way communications with one or more mobile communications networks 104, such as a cellular or satellite network.

The illustrated mobile device 300 can include a controller or processor 310 (e.g., signal processor, microprocessor, ASIC, or other control and processing logic circuitry) for performing such tasks as signal coding, data processing, input/output processing, power control, and/or other functions. An operating system 312 can control the allocation and usage of the components 302 and provide support for one or more application programs 314. The application programs can include common mobile computing applications (e.g., image-related applications, email applications, calendars, contact managers, web browsers, messaging applications), or any other computing application.

The illustrated mobile device 300 can include memory 320. Memory 320 can include non-removable memory 322 and/or removable memory 324. The non-removable memory 322 can include RAM, ROM, flash memory, a hard disk, or other well-known memory storage technologies. The removable memory 324 can include flash memory or a Subscriber Identity Module (SIM) card, which is well known in GSM communication systems, or other well-known memory storage technologies, such as "smart cards." The memory 320 can be used for storing data and/or code for running the operating system 312 and the application programs 314. Example data can include web pages, text, images, sound files, video data, or other data sets to be sent to and/or received from one or more network servers or other devices via one or more wired or wireless networks. The memory 320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 300 can support one or more input devices 330 for responding to inputs from users and other sources. Such input devices may include a touch screen 332, microphone 334, camera 336, physical keyboard 338, trackball 340, and/or proximity sensor 342, and one or more output devices 350, such as a speaker 352 and one or more displays 354. Other possible output devices (not shown) can include piezoelectric or haptic output devices. Some devices can serve more than one input/output function. For example, touch screen 332 and display 354 can be combined into a single input/output device.

In some implementations the various input devices 330 may support natural user interface (NUI) methods. Examples of NUI methods include those relying on speech recognition, touch and stylus recognition, gesture recognition both on screen and adjacent to the screen, air gestures, head and eye tracking, voice and speech, vision, touch, gestures, and machine intelligence. Specific categories of NUI technologies on which Microsoft® is working include touch sensitive displays, voice and speech recognition, intention and goal understanding, motion gesture detection using depth cameras (such as stereoscopic camera systems, infrared camera systems, red-green-blue camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

A wireless modem 360 can be coupled to an antenna (not shown) and can support two-way communications between the processor 310 and external devices, as is well understood in the art. The modem 360 is shown generically and can include a cellular modem for communicating with the mobile communication network 304 and/or other radio-based modems (e.g., Bluetooth 364 or Wi-Fi 362). The wireless modem 360 is typically configured for communication with one or more cellular networks, such as a GSM network for data and voice communications within a single cellular network, between cellular networks, or between the mobile device and a public switched telephone network (PSTN).

The mobile device can further include at least one input/output port 380, a power supply 382, a satellite navigation system receiver 384, such as a Global Positioning System (GPS) receiver, an accelerometer 386, a gyroscope (not shown), and/or a physical connector 390, which can be a USB port, IEEE 1394 (FireWire) port, and/or RS-232 port. The illustrated components 302 are not required or all-inclusive, as any components can be deleted and other components can be added.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media embodying computer-readable instructions which, when executed, implement a web browser comprising:
   a web browser user interface;
   a content rendering area within the web browser user interface; and
   a control layout area adjacent the content rendering area, wherein the control layout area includes a user-selectable icon that is always available to the user in the control layout area, said user-selectable icon having a single function that is user-configurable,
      wherein the single function selected by the user is assigned to the user-selectable icon and is selectable from among two available functions including a tab function and a favorites function.

2. The computer-readable storage media of claim 1 in which the control layout area further includes a navigation icon.

3. The computer-readable storage media of claim 2 in which the navigation icon includes an input field.

4. The computer-readable storage media of claim 3 in which the input field is an address bar.

5. The computer-readable storage media of claim 1 in which the web browser is a mobile web browser executable on a mobile device.

6. The computer-readable storage media of claim 1 in which the web browser user interface includes a menu icon that includes a plurality of user-selectable options, one of the user-selectable options providing one of the two available functions that is not selected by the user.

7. A computer system in which a web browser is implemented, the computer system comprising:
   a computer processor programmed to execute a process comprising:
      rendering a web browser user interface;
      detecting a user initiated event selecting a single function for a user-selectable icon that is always available to the user in a control layout area of the web browser user interface; and
      responsive to the user initiated event, assigning the selected single function to the user-selectable icon,
      wherein the single function of the user-selectable icon is selectable from among two available functions, the two available functions including a tab function and a favorites function.

8. The computer system of claim 7 further comprising changing an appearance of the user-selectable icon to reflect the selected function.

9. The computer system of claim 7 in which the web browser user interface includes a menu icon that includes a plurality of user-selectable options, one of the user-selectable options providing one of the two available functions that is not selected by the user.

10. A method for changing a function assigned to an icon presented as part of a web browser user interface, comprising
    rendering on a display a web browser user interface, the web browser user interface including a user-selectable icon that is always available on the display, the user-selectable icon having a single predefined function;
    detecting a user initiated event requesting that the single predefined function of the user-selectable icon be changed to a second function;
    responsive to the user initiated event, assigning the second function to the user-selectable icon,
    wherein the predefined function and the second function include a tab function and a favorites function, respectively.

11. The method of claim 10 in which the web browser user interface includes a menu icon that includes a plurality of user-selectable options, one of said options being the second function and further comprising automatically changing said option from the second function to the predefined function when the second function is assigned to the user-selectable icon.

* * * * *